(12) United States Patent
Ting et al.

(10) Patent No.: US 12,456,011 B2
(45) Date of Patent: Oct. 28, 2025

(54) SYSTEM AND METHOD FOR PREDICTIVE GENERATION OF ELECTRONIC QUERY DATA

(71) Applicant: BANK OF AMERICA CORPORATION, Charlotte, NC (US)

(72) Inventors: Benny Ting, Singapore (SG); Ryan Nielsen, Denver, CO (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 358 days.

(21) Appl. No.: 18/101,230

(22) Filed: Jan. 25, 2023

(65) Prior Publication Data
US 2024/0249072 A1    Jul. 25, 2024

(51) Int. Cl.
G06F 40/10 (2020.01)
G06F 16/3329 (2025.01)
G06F 40/174 (2020.01)
G06F 40/20 (2020.01)
G06F 40/274 (2020.01)

(52) U.S. Cl.
CPC ........ G06F 40/274 (2020.01); G06F 16/3329 (2019.01)

(58) Field of Classification Search
CPC .. G06F 16/9038; G06F 16/951; G06F 16/248; G06F 16/2455; G06F 40/174; G06F 9/451; G06F 16/972; G06F 16/3329; G06F 16/90335; G06F 40/20; G06F 40/30; G06F 16/953; G06F 16/24; G06F 16/245; G06F 16/24575; G06F 16/3344
See application file for complete search history.

(56) References Cited

U.S. PATENT DOCUMENTS

| | | | |
|---|---|---|---|
| 7,603,301 B1 * | 10/2009 | Regan | G06Q 10/10 705/30 |
| 8,660,849 B2 | 2/2014 | Gruber et al. | |
| 9,847,084 B2 | 12/2017 | Gustafson et al. | |
| 9,936,062 B2 | 4/2018 | Dayama et al. | |
| 10,438,264 B1 | 10/2019 | Viswanathan | |
| 10,685,187 B2 | 6/2020 | Badr et al. | |
| 10,984,782 B2 | 4/2021 | Finkelstein et al. | |
| 11,227,583 B2 | 1/2022 | Rakshit et al. | |

(Continued)

*Primary Examiner* — Olujimi A Adesanya
(74) *Attorney, Agent, or Firm* — Moore & Van Allen PLLC; Andrew T. Wood (57) ABSTRACT

Systems, computer program products, and methods are described herein for predictive generation of electronic query data. The present invention is configured to electronically receive a query string associated with an administrative body, wherein the query string corresponds to a response field, and wherein the response field is configured to receive a response string; retrieve, from a database associated with an entity, information associated with the administrative body; determine an administrative record associated with the administrative body, wherein the administrative record comprises one or more prior response strings; generate one or more customized autofill options for the response string based on at least the information associated with the administrative body and the administrative record associated with the administrative body; and transmit control signals configured to cause the endpoint device of the user to display, on a graphical user interface, the one or more customized autofill options to the user.

18 Claims, 5 Drawing Sheets

---

```
                                    300

ELECTRONICALLY RECEIVE, FROM AN ENDPOINT DEVICE OF A USER, A QUERY
      STRING ASSOCIATED WITH AN ADMINISTRATIVE BODY
                        302
                         ↓
RETRIEVE, FROM A DATABASE ASSOCIATED WITH AN ENTITY, INFORMATION
          ASSOCIATED WITH THE ADMINISTRATIVE BODY
                        304
                         ↓
   DETERMINING AN ADMINISTRATIVE RECORD ASSOCIATED WITH THE
ADMINISTRATIVE BODY, WHEREIN THE ADMINISTRATIVE RECORD COMPRISES
            ONE OR MORE PRIOR RESPONSE STRINGS
                        306
                         ↓
GENERATING ONE OR MORE CUSTOMIZED AUTOFILL OPTIONS FOR THE RESPONSE
       STRING BASED ON AT LEAST THE INFORMATION ASSOCIATED WITH THE
  ADMINISTRATIVE BODY AND THE ADMINISTRATIVE RECORD ASSOCIATED WITH
                     THE ADMINISTRATIVE BODY
                        308
                         ↓
      TRANSMITTING CONTROL SIGNALS CONFIGURED TO CAUSE THE ENDPOINT
       DEVICE OF THE USER TO DISPLAY, ON A GRAPHICAL USER INTERFACE OF THE
    ENDPOINT DEVICE, THE ONE OR MORE CUSTOMIZED AUTOFILL OPTIONS TO THE
                              USER
                              310
```

(56) References Cited

U.S. PATENT DOCUMENTS

| | | | |
|---|---|---|---|
| 11,429,601 B2 | 8/2022 | Witting et al. | |
| 2001/0027439 A1* | 10/2001 | Holtzman | G06Q 20/105 705/41 |
| 2004/0243428 A1* | 12/2004 | Black | G06Q 10/105 705/320 |
| 2008/0208819 A1* | 8/2008 | Wang | G06F 16/338 707/999.005 |
| 2008/0249761 A1* | 10/2008 | Easterly | G06F 40/56 704/3 |
| 2009/0157456 A1* | 6/2009 | Sharfman | G06Q 10/00 705/1.1 |
| 2012/0143897 A1* | 6/2012 | Wei | G06F 40/274 707/769 |
| 2014/0317502 A1 | 10/2014 | Brown et al. | |
| 2014/0344250 A1* | 11/2014 | Topatan | G06F 16/90324 707/722 |
| 2015/0254356 A1* | 9/2015 | Skrenta | G06F 16/248 707/706 |
| 2015/0347436 A1* | 12/2015 | Hiwale | G06F 16/90324 707/706 |
| 2016/0021038 A1 | 1/2016 | Woo et al. | |
| 2016/0205070 A1* | 7/2016 | Kothuvatiparambil | G06F 16/955 726/28 |
| 2017/0249595 A1* | 8/2017 | Krupa | G06Q 30/0201 |
| 2019/0074010 A1 | 3/2019 | Horling et al. | |
| 2019/0156831 A1 | 5/2019 | Carbune et al. | |
| 2019/0172454 A1 | 6/2019 | Kitajima et al. | |
| 2020/0244605 A1 | 7/2020 | Nagaraja et al. | |
| 2020/0356630 A1 | 11/2020 | Silverstein et al. | |
| 2021/0142343 A1* | 5/2021 | Gardner | G06F 40/20 |
| 2021/0406718 A1* | 12/2021 | Hall | G06F 40/35 |
| 2023/0306049 A1* | 9/2023 | Shah | G06F 16/3329 |
| 2023/0385537 A1* | 11/2023 | Yannam | G06N 3/09 |
| 2024/0143902 A1* | 5/2024 | Grant | G06F 40/143 |

\* cited by examiner

┌─────────────────────────────────────────────────────────────┐
│ ELECTRONICALLY RECEIVE, FROM AN ENDPOINT DEVICE OF A USER,  │
│      A QUERY STRING ASSOCIATED WITH AN ADMINISTRATIVE BODY  │
│                            302                              │
└─────────────────────────────────────────────────────────────┘
                              ↓
┌─────────────────────────────────────────────────────────────┐
│  RETRIEVE, FROM A DATABASE ASSOCIATED WITH AN ENTITY,       │
│  INFORMATION ASSOCIATED WITH THE ADMINISTRATIVE BODY        │
│                            304                              │
└─────────────────────────────────────────────────────────────┘
                              ↓
┌─────────────────────────────────────────────────────────────┐
│   DETERMINING AN ADMINISTRATIVE RECORD ASSOCIATED WITH THE  │
│ ADMINISTRATIVE BODY, WHEREIN THE ADMINISTRATIVE RECORD      │
│ COMPRISES ONE OR MORE PRIOR RESPONSE STRINGS                │
│                            306                              │
└─────────────────────────────────────────────────────────────┘
                              ↓
┌─────────────────────────────────────────────────────────────┐
│ GENERATING ONE OR MORE CUSTOMIZED AUTOFILL OPTIONS FOR THE  │
│ RESPONSE STRING BASED ON AT LEAST THE INFORMATION           │
│ ASSOCIATED WITH THE ADMINISTRATIVE BODY AND THE             │
│ ADMINISTRATIVE RECORD ASSOCIATED WITH THE ADMINISTRATIVE    │
│ BODY                                                        │
│                            308                              │
└─────────────────────────────────────────────────────────────┘
                              ↓
┌─────────────────────────────────────────────────────────────┐
│ TRANSMITTING CONTROL SIGNALS CONFIGURED TO CAUSE THE        │
│ ENDPOINT DEVICE OF THE USER TO DISPLAY, ON A GRAPHICAL USER │
│ INTERFACE OF THE ENDPOINT DEVICE, THE ONE OR MORE           │
│ CUSTOMIZED AUTOFILL OPTIONS TO THE USER                     │
│                            310                              │
└─────────────────────────────────────────────────────────────┘
```

FIG. 3

SYSTEM AND METHOD FOR PREDICTIVE GENERATION OF ELECTRONIC QUERY DATA

FIELD OF THE INVENTION

The present invention embraces a system for predictive generation of electronic query data.

BACKGROUND

Autofill enables users to quickly provide response strings to query strings of a questionnaire based on prior response strings. However, the efficacy of providing response strings is limited to providing autofill response strings only for query strings identical to those presently presented to a user. Moreover, many different administrative bodies provide questionnaires to entities with similar types of query strings, albeit worded differently with different requirements for each administrative body. Accordingly, there is a need for a system to leverage relationship information of administrative bodies with an entity for predictive generation of electronic query data.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for predictive generation of electronic query data is presented. The system comprising: at least one non-transitory storage device; and at least one processing device coupled to the at least one non-transitory storage device, wherein the at least one processing device is configured to: electronically receive, from an endpoint device of a user, a query string associated with an administrative body, wherein the query string corresponds to a response field, and wherein the response field is configured to receive a response string; retrieve, from a database associated with an entity, information associated with the administrative body; determine an administrative record associated with the administrative body, wherein the administrative record comprises one or more prior response strings; generate one or more customized autofill options for the response string based on at least the information associated with the administrative body and the administrative record associated with the administrative body; and transmit control signals configured to cause the endpoint device of the user to display, on a graphical user interface of the endpoint device, the one or more customized autofill options to the user.

In some embodiments, the at least one processing device is further configured to: determine one or more articulation levels associated with the one or more customized autofill options; tag the one or more customized autofill options with the one or more articulation levels corresponding to the one or more customized autofill options.

In some embodiments, the at least one processing device is further configured to: determine an articulation level requirement of the administrative body; determine one or more applicable customized autofill options from the one or more customized autofill options based on at least the articulation level requirement of the administrative body; and transmit control signals configured to cause the endpoint device of the user to display, on the graphical user interface of the endpoint device, the one or more applicable customized autofill options to the user.

In some embodiments, the at least one processing device is further configured to: generate one or more complete response strings based on at least the query string and the one or more customized autofill options; determine one or more solutions to the one or more complete response strings; determine one or more unique solutions from the one or more solutions; and transmit control signals configured to cause the endpoint device of the user to display, on the graphical user interface of the endpoint device, the one or more customized autofill options associated with the one or more unique solutions to the user.

In some embodiments, the at least one processing device is further configured to: initiate a vectorization engine on the one or more solutions; vectorize, using the vectorization engine, the one or more solutions into a vector of real numbers; map, using the vectorization engine, the one or more vectorized solutions in a vector space; and determine a similarity measure associated with each of the one or more solutions, wherein determining further comprises determining a distance measure between each of the one or more vectorized solutions and one or more centroids of one or more clusters formed by the one or more vectorized solutions.

In some embodiments, the at least one processing device is further configured to: compare the similarity measure associated with each of the one or more solutions with a predetermined threshold; determine that the similarity measure associated with each of the one or more solutions is greater than the predetermined threshold; and determine the one or more unique solutions based on at least determining the one or more solutions with the similarity measure that is greater than the predetermined threshold.

In some embodiments, the administrative record further comprises one or more prior query strings corresponding to the one or more prior response strings.

In another aspect, a computer program product for predictive generation of electronic query data is presented. The computer program product comprising a non-transitory computer-readable medium comprising code causing a first apparatus to: electronically receive, from an endpoint device of a user, a query string associated with an administrative body, wherein the query string corresponds to a response field, and wherein the response field is configured to receive a response string; retrieve, from a database associated with an entity, information associated with the administrative body; determine an administrative record associated with the administrative body, wherein the administrative record comprises one or more prior response strings; generate one or more customized autofill options for the response string based on at least the information associated with the administrative body and the administrative record associated with the administrative body; and transmit control signals configured to cause the endpoint device of the user to display, on a graphical user interface of the endpoint device, the one or more customized autofill options to the user.

In yet another aspect, a method for predictive generation of electronic query data is presented. The method comprising: electronically receiving, from an endpoint device of a user, a query string associated with an administrative body, wherein the query string corresponds to a response field, and wherein the response field is configured to receive a response string; retrieving, from a database associated with an entity, information associated with the administrative body; determining an administrative record associated with the administrative body, wherein the administrative record comprises one or more prior response strings; generating one or more customized autofill options for the response string based on at least the information associated with the administrative body and the administrative record associated with the administrative body; and transmitting control signals configured to cause the endpoint device of the user to display, on a graphical user interface of the endpoint device, the one or more customized autofill options to the user.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

The technology described herein implements a machine learning model to enhance the autofill process of completing a questionnaire, such as to predictively generate a response string for the given query string based on prior response strings stored in an administrative record and associated therewith with similar or identical query string(s).

Prior to the invention described herein, autofill capabilities were generally limited to suggesting response string(s) for questions (e.g., query strings) identical to those for which the system had previously received response strings. For example, if a prior query string recited "please list your telephone number" and an associated response, prior to the invention described herein, the system would be ill-equipped to provide an autofill response to a query string simply reciting "phone number" since the two query strings are not identical.

The invention disclosed herein provides a system, method, and computer program product that may include a machine learning model alongside natural language processing, such that a desired response string is predicted based on the query string. In some embodiments, the relationship between the user (e.g., the user associated with the entity) and the entity, and/or the administrative body's response string requirements, such as the articulation level, are taken into consideration to tailor the one or more customized autofill options to the questionnaire at hand. Furthermore, in some embodiments duplicate or identical customized autofill options are also removed from the options presented to the user.

Accordingly, the present disclosure provides for the predictive generation of electronic query data (e.g., response string(s)). A query string associated with an administrative body may be electronically received. Thereafter, information associated with the administrative body may be retrieved from a database associated with an entity. An administrative record that includes prior response strings may be determined to be associated with the administrative body. Then, customized autofill options for the response string may be generated based on at least the information associated with the administrative body and the administrative record. Control signals may then be transmitted which are configured to display the customized autofill options on the endpoint device. In some embodiments, one or more articulation levels associated with the one or more customized autofill options may be determined and tagged therewith. In some embodiments, a relationship level may be determined between the user and the entity, and the customized autofill options may be determined from the relationship level. In some embodiments, complete response strings based on at least the query string and the customized autofill options may be generated, one or more solutions may be determined, and one or more unique solutions determined thereof. In some embodiments, a vectorization engine may be initiated, which vectorizes and maps the solutions and thereafter a similarity measure between the solutions is determined. In some embodiments, the similarity measure associated with the solutions is compared to a predetermined threshold, and the unique solutions based on the comparison with the predetermined threshold are determined.

What is more, the present invention provides a technical solution to a technical problem. As described herein, the technical problem includes the inability for current systems to provide autofill responses for a questionnaire with questions which are not identical to those previously responded to. The technical solution presented herein allows for the autofill of response strings within questionnaires provided by multiple administrative bodies, where the query strings are phrased in non-identical ways when compared to prior query strings. In particular, the system is an improvement over existing autofill systems by completing questionnaires and the response strings therein (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing and manual resources.

Figure 1A:
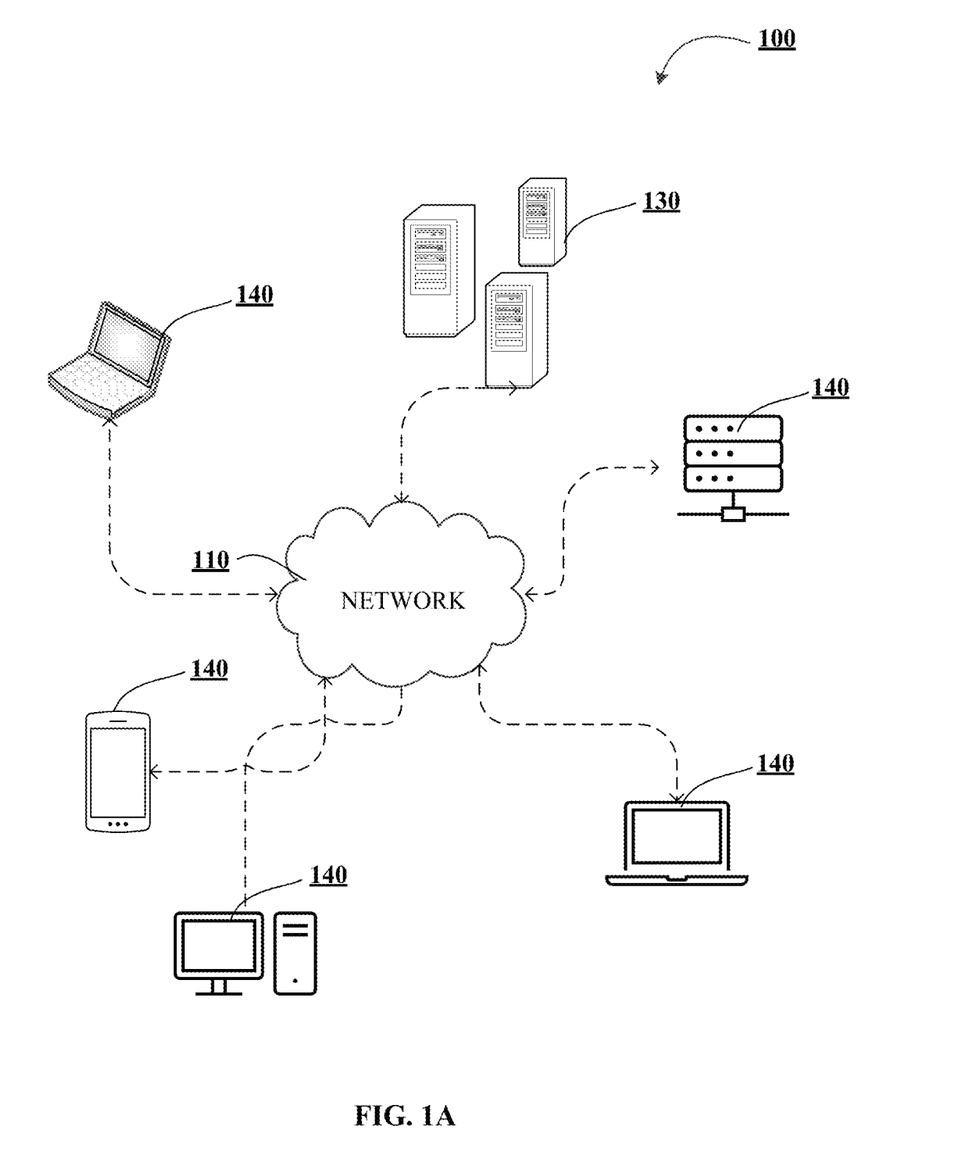
FIGS. 1A-1C illustrate technical components of an exemplary distributed computing environment for predictive generation of electronic query data, in accordance with an embodiment of the invention.
Figure 1B:
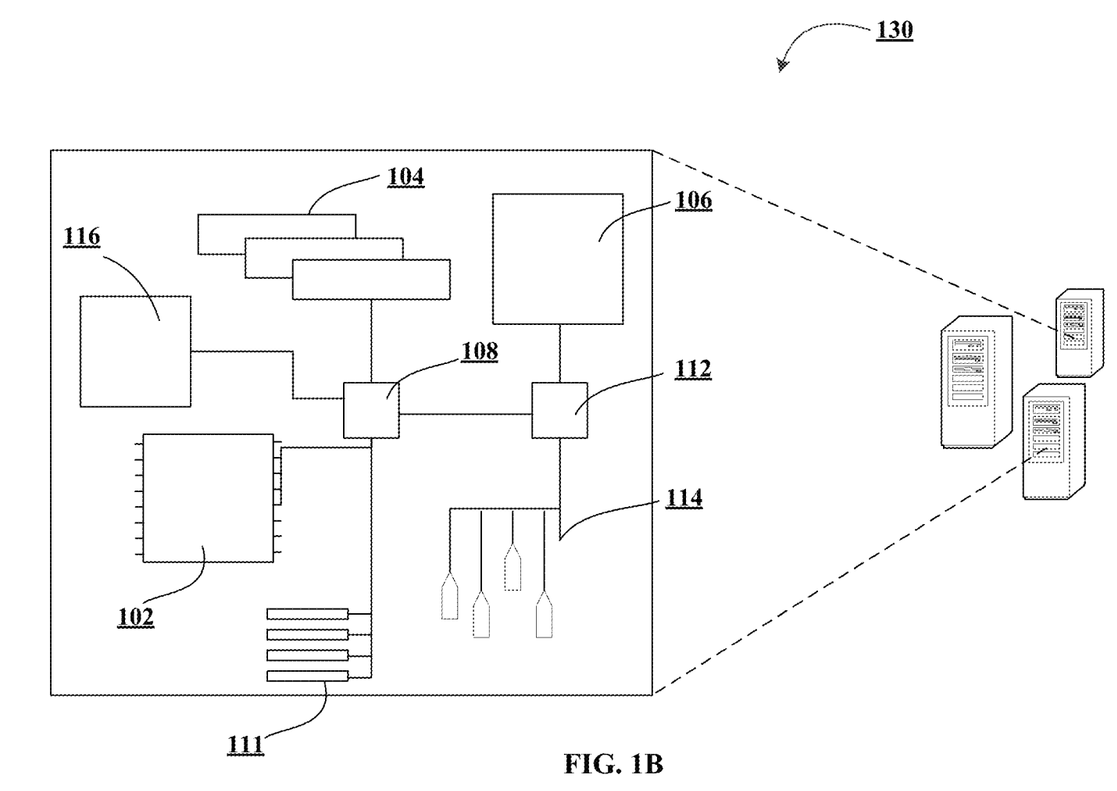
Figure 1C:
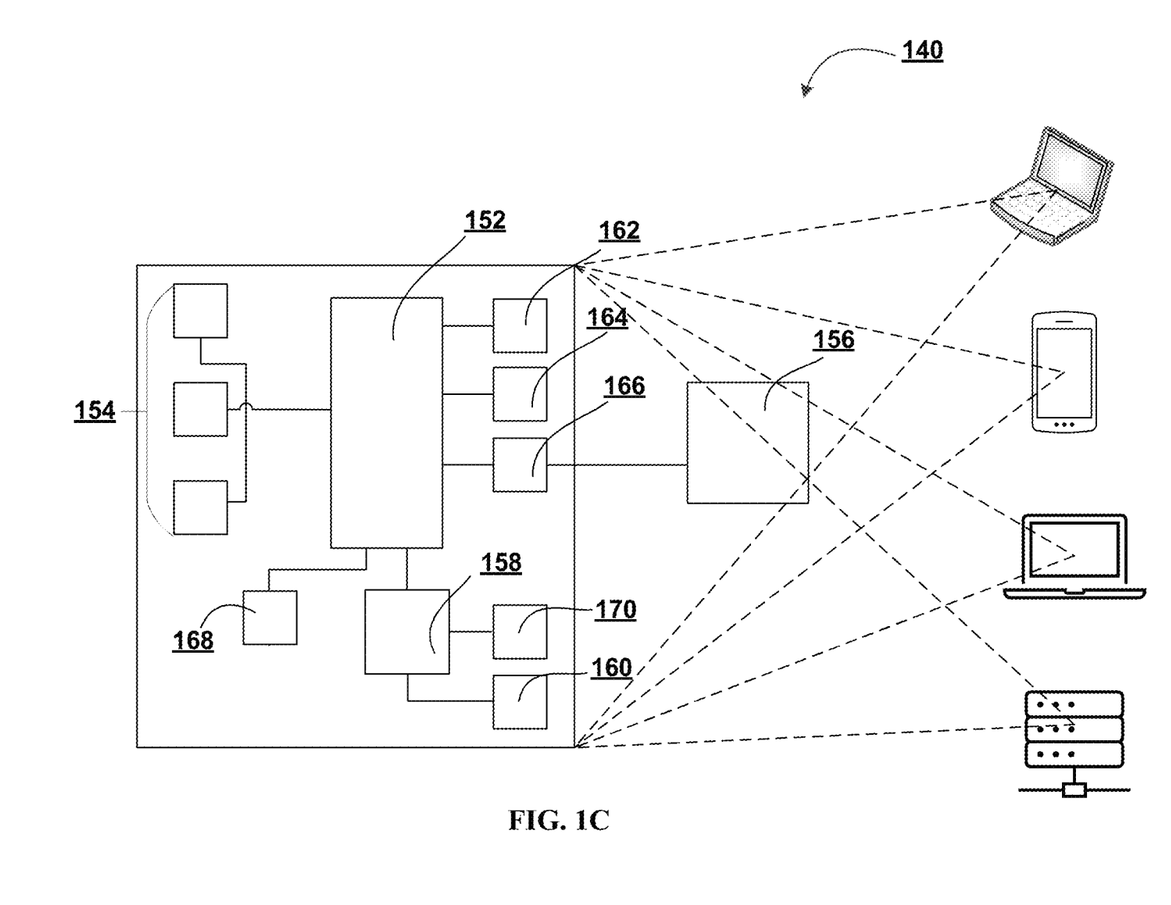

FIGS. 1A-1C illustrate technical components of an exemplary distributed computing environment 100 for predictive generation of electronic query data, in accordance with an embodiment of the invention. As shown in FIG. 1A, the distributed computing environment 100 contemplated herein may include a system 130, an endpoint device(s) 140, and a network 110 over which the system 130 and endpoint device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the endpoint device(s) 140 may have a client-server relationship in which the endpoint device(s) 140 are remote devices that request and receive service from a centralized server, i.e., the system 130. In some other embodiments, the system 130 and the endpoint device(s) 140 may have a peer-to-peer relationship in which the system 130 and the endpoint device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The endpoint device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 connecting to low speed bus 114 and storage device 106. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the endpoint device(s) 140, in accordance with an embodiment of the invention. As shown in FIG. 1C, the endpoint device(s) 140 includes a processor 152, memory 154, an input/output device such as a display 156, a communication interface 158, and a transceiver 160, among other components. The endpoint device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the endpoint device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the endpoint device(s) 140, such as control of user interfaces, applications run by endpoint device(s) 140, and wireless communication by endpoint device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of endpoint device(s) 140 with other devices. External interface 168 may provide, for example, for wired communication in some implementations, or for wireless communication in other implementations, and multiple interfaces may also be used.

The memory 154 stores information within the endpoint device(s) 140. The memory 154 can be implemented as one or more of a computer-readable medium or media, a volatile memory unit or units, or a non-volatile memory unit or units. Expansion memory may also be provided and connected to endpoint device(s) 140 through an expansion interface (not shown), which may include, for example, a SIMM (Single In Line Memory engine) card interface. Such expansion memory may provide extra storage space for endpoint device(s) 140 or may also store applications or other information therein. In some embodiments, expansion memory may include instructions to carry out or supplement the processes described above and may include secure information also. For example, expansion memory may be provided as a security module for endpoint device(s) 140 and may be programmed with instructions that permit secure use of endpoint device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the endpoint device(s) 140 to transmit and/or receive information or commands to and from the system 130 via the network 110. Any communication between the system 130 and the endpoint device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the endpoint device(s) 140 may provide the system 130 (or other client devices) permissioned access to the protected resources of the endpoint device(s) 140, which may include a GPS device, an image capturing component (e.g., camera), a microphone, and/or a speaker.

The endpoint device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to endpoint device(s) 140, which may be used as appropriate by applications running thereon, and in some embodiments, one or more applications operating on the system 130.

The endpoint device(s) 140 may also communicate audibly using audio codec 162, which may receive spoken information from a user and convert it to usable digital information. Audio codec 162 may likewise generate audible sound for a user, such as through a speaker, e.g., in a handset of endpoint device(s) 140. Such sound may include sound from voice telephone calls, may include recorded sound (e.g., voice messages, music files, etc.) and may also include sound generated by one or more applications operating on the endpoint device(s) 140, and in some embodiments, one or more applications operating on the system 130.

Various implementations of the distributed computing environment 100, including the system 130 and endpoint device(s) 140, and techniques described here can be realized in digital electronic circuitry, integrated circuitry, specially designed ASICs (application specific integrated circuits), computer hardware, firmware, software, and/or combinations thereof.

Figure 2:
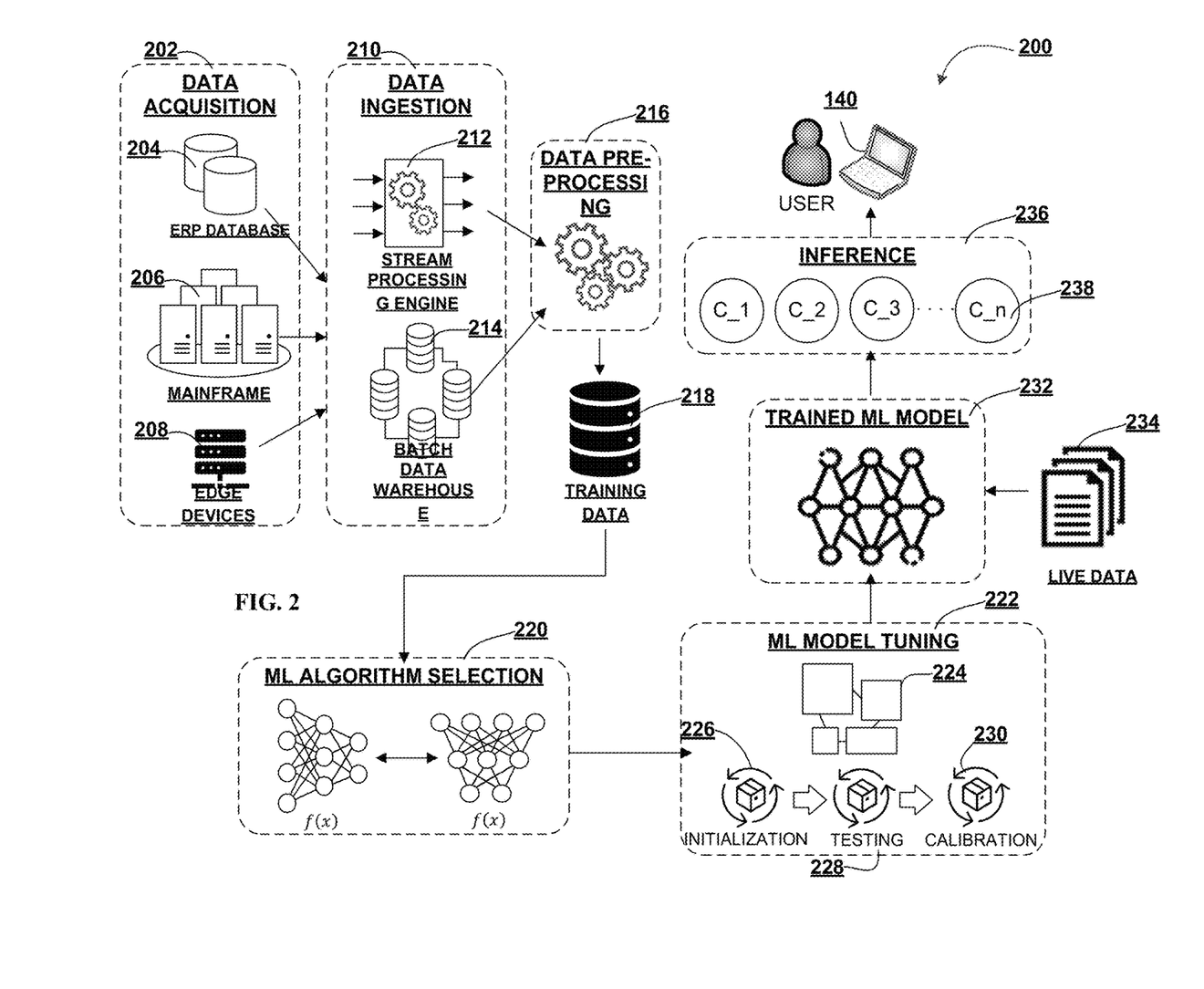
FIG. 2 illustrates an exemplary machine learning subsystem architecture, in accordance with an embodiment of the invention.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . C_n 238) live data 234 based on how similar they are to one another to solve exploratory challenges where little is known about the data, provide a description or label (e.g., C_1, C_2 . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

Figure 3:
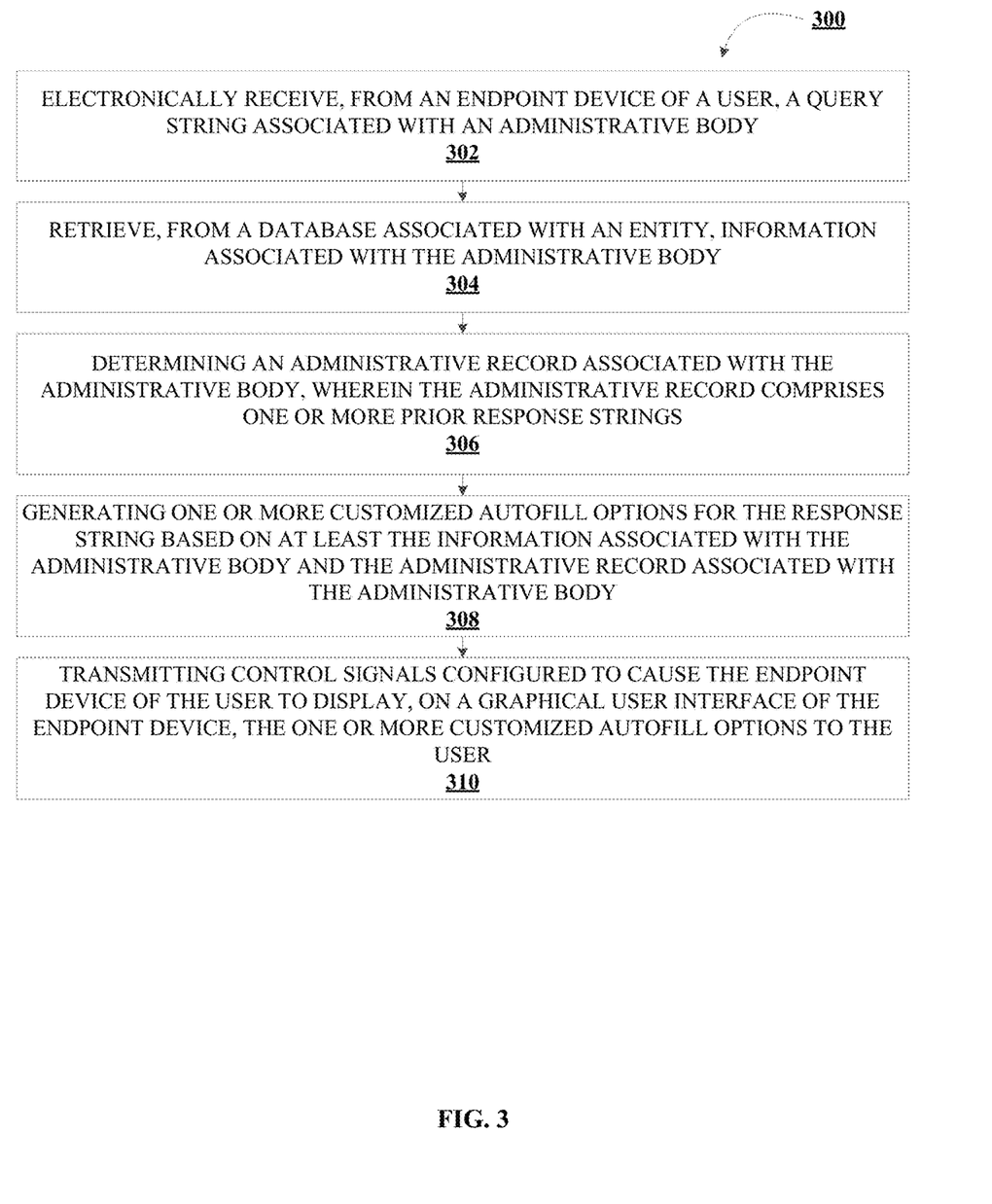
FIG. 3 illustrates a process flow for predictive generation of electronic query data, in accordance with an embodiment of the invention.

FIG. 3 illustrates a process flow 300 for predictive generation of electronic query data, in accordance with an embodiment of the invention. The process may begin at block 302. As shown in block 302, the process flow includes electronically receiving, from an endpoint device of a user, a query string associated with an administrative body, wherein the query string corresponds to a response field, and wherein the response field is configured to receive a response string. In this regard, the system may be configured to provide a proprietary endpoint application associated with the entity for installation on the endpoint device of a user associated with the entity. For example, the proprietary endpoint application may be an application configured to be implemented and utilized by users associated with the entity to address inquiries (e.g., questionnaires) to the entity by administrative bodies (e.g., administrative agencies). Each questionnaire may include one or more questions in the form of query strings, with the query strings being associated with corresponding response fields typically completed manually by the user associated with the entity in response to each of the query strings. Each response field may be structured to receive a response string, such as text. As previously explained, traditional methods for completing response fields use response strings input manually (e.g., typed) by the user associated with the entity. However, it is the objective of the present invention to supply customized autofill options to the user associated with the entity to achieve greater efficiency in answering the questionnaire.

As used herein, a "administrative body" may refer to any organization outside of the entity that monitors and provides inquiries (via questionnaires) to the entity about the entity's activities surrounding data security, financial security, etc. The administrative body may routinely provide the entity with a series of questions related to such activities, via a questionnaire, to the entity. Examples of administrative bodies include, but are not limited to: Consumer Financial Protection Bureau ("CFPB"); Federal Deposit Insurance Corporation ("FDIC"); Federal Emergency Management Agency ("FEMA"); Federal Financial Institutions Examination Council ("FFIEC"); Federal Reserve ("FRB"); Federal Trade Commission ("FTC"); Housing and Urban Development & Federal Housing Administration ("HUD/FHA"); Internal Revenue Service ("IRS"); Office of the Comptroller of the Currency ("OCC"); Securities and Exchange Commission ("SEC"); and U.S. Department of the Treasury ("Treasury"). Is should be appreciated that entities that engage in international transactions may be subject to numerous other administrative bodies for each jurisdiction with which the entity engages. Additionally, or alternatively, an administrative body may be internal to the entity such that one group or portion of the entity is inquiring about another group or portion of the entity. Indeed, although the present description is directed to the relationship between the entity and one or more administrative bodies, the invention may be suitable for any number of uses where a questionnaire requires completion.

It may be the responsibility of a user associated with the entity (e.g., a "user") to transform and/or translate the questions (e.g., query strings) of the questionnaire via copying or otherwise to populate the query data within the proprietary endpoint application. In some embodiments, the proprietary endpoint application may be structured with software to retrieve query strings from the questionnaire via a natural language processing ("NLP") engine, (and in some embodiments, in conjunction with an optical character recognition ("OCR") engine if necessary to convert handwritten or other text into machine-readable text). The NLP engine may parse the document and convert the questions into a structured format such that each question corresponds to an input provided by the proprietary endpoint application to be completed by a user associated with the entity.

To submit query data (e.g., query string(s) and/or response string(s)), the user may be required to open the proprietary endpoint application and sign in using valid authentication credentials for identity verification. Once the user's identity is verified, the user may navigate the proprietary endpoint application to identify the section of the mobile application that is configured to accept one or more query strings. Accordingly, the system may be configured to receive the query string(s) from the user via the section of the mobile application that is configured to accept query string(s) from the user. In some embodiments, the query string(s) may thereafter be provided to the machine learning model for processing, with or without inputs/training data as will be described hereinafter, to ultimately generate the customized autofill option(s) for the response string(s) as required for the query string(s).

Next, as shown in block 304, the process flow includes retrieving, from a database associated with an entity, information associated with the administrative body. In some embodiments, the information associated with the administrative body may include information identifying the administrative body (such as the name and/or acronym of the administrative body, the jurisdiction of origin, time zone of the administrative body, holidays and/or office closures of the administrative body). In some embodiments, the administrative record may also include information associated with the administrative body's requirements (such as articulation level of response strings required, any response string formatting requirements such as font, length of response string), information associated with one or more groups of the entity with which the administrative body communicates or is authorized to communicate, information associated with the frequency and/or regularity of questionnaires sent to the entity from the administrative body, information associated with due dates and or response time requirements specific to the administrative body, and/or the like.

Next, as shown in block 306, the process flow includes determining an administrative record associated with the administrative body, wherein the administrative record comprises one or more prior response strings. In some embodiments, the administrative record may include all query strings over a period of time (e.g., prior query strings) corresponding to the prior response strings, such that the administrative record includes a repository of both the prior query strings and prior response strings to assist the system in generating the most desirable customized autofill options. In some embodiments, the administrative record may be associated with multiple administrative bodies.

In some embodiments, the system may parse the questionnaire (comprising query strings and response fields) to determine the administrative body associated with the questionnaire by searching for words within the questionnaire that match the information identifying the administrative body (from the information associated with the administrative body stored in the database associated with the entity). For example, an acronym may refer to one particular administrative body, and if the acronym appears within the questionnaire, it is assumed that the questionnaire is associated with that particular administrative body. Assuming the system positively matches the questionnaire to an administrative body, this match information may be used to identify customized autofill options that do not meet the administrative body's requirements, such as those which do not meet the relationship level and/or articulation level as will be described in further detail herein.

Both the information associated with the administrative body and the administrative record associated with the administrative body are available to the entity based on an existing relationship of the administrative body with the entity. In one example, the administrative body may have a history of providing questionnaires to the entity, where the administrative body has provided prior query strings to the entity in some capacity. Further, the corresponding response strings (e.g., prior response strings) to these prior query strings are available to the system through the existing relationship, for example through prior communications between the administrative body and the entity. In some cases, the information associated with the administrative body may be provided to the entity by the administrative body in course of everyday interactions of the administrative body with the entity. In other cases, the information associated with the administrative body may be gathered by the entity in the course of everyday interactions of with the administrative body.

Next, as shown in block 308, the process flow includes generating one or more customized autofill options for the response string based on at least the information associated with the administrative body and the administrative record associated with the administrative body. In some embodiments, the system may be configured to implement natural language processing algorithms and techniques (e.g., natural language processing engine) to extract information from the query string. By implementing natural language processing algorithms and techniques, the system of the present invention focuses on understanding the query string, instead of simply finding literal matches or representing knowledge in a way that is suitable for meaningful retrieval. To achieve this, the system of the present invention may implement semantic information retrieval techniques such as named entity recognition, sentiment analysis, text summarization, aspect mining, textual similarity, topic modelling, and/or the like. By implementing natural language processing algorithms and techniques on the one or more query strings, the system may be configured to generate more accurate customized autofill options for the user.

It shall be appreciated that identical or similar query strings may have been previously provided to the entity by one or more administrative bodies distinct from the administrative body providing the instant questionnaire. Accordingly, each of the available administrative records may be shared by one or more administrative bodies, such that prior response strings corresponding to same or similar query strings in questionnaires of the alternate administrative bodies may be used by the system in generating one or more customized autofill options, as will be described in detail herein.

In some embodiments, the system may be configured to tag the customized autofill options with an articulation level to indicate the language complexity level and/or level of detail the corresponding solution is associated with. In some embodiments, the response string to a query string may be generated in several various ways, some of which are articulated with complexity (e.g., level of detail) such as to completely convey the intricacies of any given process to an administrative body. However, it should be appreciated that entities and/or administrative bodies may wish to only disclose a minimal amount of information regarding such processes in order to fully satisfy the requirements of the query string of the administrative bodies and withhold the intricacies for security purposes. For example, the entity may not wish to disclose the IP address of a given server unless explicitly required to do so. Accordingly, an administrative body may respond with one or more follow-up questions, as needed, to ascertain additional intricacies initially withheld by the entity. As the user is presented with a customized autofill option as an input in response to the query string(s), it may be beneficial for the user to verify the articulation level of the input prior to submitting the questionnaire.

Accordingly, the one or more customized autofill options may be tagged with an articulation level. In some embodiments, the articulation level may be inferred based on the word count or character count of the customized autofill options. To do so, a user may specify a predetermined threshold to the machine learning engine with word count or character counts that serve as boundaries for "low" "medium" and "high" articulation levels. For example, the user may indicate that a customized autofill option with fewer than two-hundred words should receive a "low articulation level" tag, word counts between two-hundred and four-hundred should receive a "medium articulation level" tag, and higher word counts should receive a "high articulation level" tag. In other embodiments, the natural language processing engine may compute the Token Type Ratio ("TTR") or Hapax richness to determine the "low" "medium" and "high" articulation levels and corresponding tags. As will be appreciated by one of skill in the art, the TTR is the number of unique words divide by the total number of words in the customized autofill option. The Hapax richness is the number of words occurring only once divided by the total number of words. Once again, a user may provide the thresholds for the TTR or Hapax richness, such that, as one non-limiting example, a TTR or Hapax richness from zero up to 0.5 should receive a "low articulation level" tag, a TTR or Hapax richness between 0.5 and 0.9 should receive a "medium articulation level" tag, and higher TTRs or Hapax richness scores should receive a "high articulation level" tag.

For example, a query string may ask "does the mobile deposit application require multi-factor authentication?" Prior to the system completing the response string via autofill, the system may provide a plurality of customized autofill options, each one with a different tag related to the corresponding articulation level of the customized autofill options. In some embodiments, for a given query string (in conjunction with the information associated with the administrative body) the system may indicate the lack of necessity to provide a plurality of options for the response string, and instead the system may only present one customized autofill option. For example, the information associated with the administrative body of a particular administrative body may indicate that the administrative body requires response strings with a high articulation level tag, thus the system prepares only one customized autofill option (e.g., the customized autofill option having the requisite high articulation tag). In some embodiments, the machine learning engine may be provided with a predetermined target word count, TTR, or Hapax richness (or simply a target articulation level) and as such that the machine learning engine may generate the one or more customized autofill options with a predetermined correlation to the articulation level tags. In other embodiments, the machine learning engine may generate the one or more customized autofill options and thereafter, the system applies tags. In this way, as each customized autofill option is generated, the system may be configured to tag each customized autofill option with the corresponding articulation level, thereby providing the user with an array of options to use as the response string and arrive at the appropriate response required by the administrative body.

In some embodiments, the system may be configured to provide the user (e.g., the user associated with the entity) with customized autofill options that are associated with solutions that the administrative body prefers to receive as response strings, based on the articulation level requirements noted in the information associated with the administrative body. In one aspect, the entity may have recorded in the information associated with the administrative body that the particular administrative body requires a high articulation level. Based on the articulation level requirement, i.e., depending on which articulation level tag the administrative body requires, the solutions available to the user in response to the query string may vary. Accordingly, the customized autofill options that reflect the available solutions will also vary based on the articulation level requirement of the administrative body. Therefore, the system may be configured to determine one or more applicable customized autofill options from the one or more customized autofill options based on at least the articulation level requirement of the administrative body. In this way, the system may be configured to remove customized autofill options that reflect solutions that do not meet the articulation level requirements of a particular administrative body.

In some embodiments, the process flow may include retrieving, from a database associated with an entity, information associated with the user. In some embodiments, the information associated with the user may include, information associated with any previous queries submitted by the user, a geographic location of the user, information identifying the user (such as user's name, address, phone number, and/or the like), information associated with the user's employment, education level, relationship level of the user with the entity, and/or the like.

In some embodiments, the system may be configured to provide the user (e.g., the user associated with the entity)

with customized autofill options that are associated with solutions that the user is eligible to receive based on a relationship level of the user with the entity. It shall be appreciated that within an entity, users associated with the entity may intentionally have various levels of knowledge of different aspects of the entity, such as to limit the exposure of sensitive information to those users who are not required to know such sensitive information to perform their duties. In other words, there may be security clearances within various levels of the organization that may affect the response strings provided during completion of the questionnaire. In one aspect, an entity may have a tiered relationship option where a user typically has to meet predetermined eligibility criteria associated with each tier to qualify for that particular tier and continue to meet the eligibility criteria to remain in the tier. Based on the relationship level of the user with the entity, i.e., depending on which tier the user falls in, the solutions available to the user in response to the query string may vary. Accordingly, the customized autofill options that reflect the available solutions will also vary based on the relationship level of the user with the entity. Therefore, the system may be configured to determine one or more applicable customized autofill options from the one or more customized autofill options based on at least the relationship level of the user with the entity. In this way, the system may be configured to remove customized autofill options that reflect solutions that the user may not be qualified or permitted to see and retain those that the user does qualify for.

In some embodiments, the system may be configured to remove any customized autofill option that may be associated with a duplicate solution—a solution that is already associated with an existing customized autofill option provided to the user. In this regard, the system may be configured to generate one or more complete response strings based on at least the query string and the one or more customized autofill options. In response, the system may be configured to determine one or more solutions to the one or more complete response strings. In response, the system may be configured to determine one or more unique solutions from the one or more solutions. In this regard, the system may be configured to initiate a vectorization engine on the one or more solutions. In response, the system may be configured to vectorize, using the vectorization engine, the one or more solutions into a vector of real numbers. In response to vectorizing the one or more solutions, the system may be configured to map, using the vectorization engine, the one or more vectorized solutions in a vector space. Once mapped, the system may be configured to determine a similarity measure associated with each of the one or more solutions. In one aspect, the similarity measure may be a distance between each of the one or more vectorized solutions and one or more centroids of one or more clusters formed by the one or more vectorized solutions.

In response to determining the similarity measure, the system may be configured to compare the similarity measure associated with each of the one or more solutions with a predetermined threshold. The predetermined threshold may be used to determine how similar or close a particular solution is to another solution (or a set of solutions). In response to comparing, the system may be configured to determine that the similarity measure associated with each of the one or more solutions is greater than the predetermined threshold. Here, the shorter the distance, the more similar the solutions are. If the similarity measure is greater than the predetermined threshold, it is an indication that the solutions are unique enough for independent consideration. The predetermined threshold may be selected such that even variations of the same solution with different articulation levels (e.g., tagged with different articulation levels) would be considered above the predetermined threshold and thus unique enough for independent consideration. In response, the system may be configured to determine the one or more unique solutions based on at least determining the one or more solutions with the similarity measure that is greater than the predetermined threshold. On the other hand, if the similarity measure is lower than the predetermined threshold, it is an indication that the solutions are not unique enough for independent consideration. In response, the system may be configured to remove duplicate solutions and retain only the unique solutions.

Next, as shown in block 310, the process flow includes transmitting control signals configured to cause the endpoint device of the user to display, on a graphical user interface of the endpoint device, the one or more customized autofill options to the user (e.g., the user associated with the entity). In response, the system may be configured to electronically receive, from the endpoint device of the user, a user input selecting at least one of the one or more customized autofill options. In response to receiving the user input, the system may be configured to retrieve the solution corresponding to the customized autofill option selected by the user.

In some embodiments, the system may be configured to store the solutions corresponding to the customized autofill options in a volatile or cache memory for efficient retrieval. In this regard, the system may be configured to retrieve the one or more solutions associated with the one or more customized autofill options from one or more databases associated with the entity as the query string is received. These solutions are then stored by the system in one or more volatile or cache memories until the corresponding customized autofill option is either selected by the user or the customized autofill option is no longer presented as an option. If a customized autofill option is selected by the user, the system may be configured to retrieve the corresponding solution from the volatile or cache memory and display the solution to the user and/or insert the solution into the response field. On the other hand, if the customized autofill option is no longer presented as an option (because the solution was duplicative, the user not being qualified/eligible to receive the corresponding solution, and/or the like), the corresponding solution is deleted from the volatile or cache memory and in some embodiments replaced with a more relevant solution.

In some embodiments, the user may not select any of the customized autofill options, and instead may generate their own response string manually. Accordingly, the system may receive the response string generated by the user manually and store the response string and corresponding query string in the administrative record and/or the machine learning model for use with subsequent query string(s).

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for predictive generation of electronic query data, the system comprising:
   at least one non-transitory storage device; and
   at least one processing device coupled to the at least one non-transitory storage device, wherein the at least one processing device is configured to:
   electronically receive, from an endpoint device, a query string associated with an administrative body, wherein the query string corresponds to a response field, and wherein the response field is configured to receive a response string;
   retrieve, from a database associated with an entity, information associated with the administrative body;

determine an administrative record associated with the administrative body, wherein the administrative record comprises one or more prior response strings;

generate, using a machine learning model trained using prior query strings, one or more customized autofill options for the response string based on at least the information associated with the administrative body and the administrative record associated with the administrative body;

determine one or more articulation levels, based on a linguistic complexity metric, associated with the one or more customized autofill options;

tag the one or more customized autofill options with the one or more articulation levels corresponding to the one or more customized autofill options; and transmit control signals configured to cause the endpoint device to display, on a graphical user interface of the endpoint device, the one or more customized autofill options.

2. The system of claim 1, wherein the at least one processing device is further configured to:

determine an articulation level requirement of the administrative body;

determine one or more applicable customized autofill options from the one or more customized autofill options based on at least the articulation level requirement of the administrative body; and transmit control signals configured to cause the endpoint device to display, on the graphical user interface of the endpoint device, the one or more applicable customized autofill options.

3. The system of claim 1, wherein the at least one processing device is further configured to:

generate one or more complete response strings based on at least the query string and the one or more customized autofill options;

determine one or more solutions to the one or more complete response strings;

determine one or more unique solutions from the one or more solutions; and transmit control signals configured to cause the endpoint device to display, on the graphical user interface of the endpoint device, the one or more customized autofill options associated with the one or more unique solutions.

4. The system of claim 3, wherein the at least one processing device is further configured to:

initiate a vectorization engine on the one or more solutions;

vectorize, using the vectorization engine, the one or more solutions into a vector of real numbers;

map, using the vectorization engine, the one or more vectorized solutions in a vector space; and determine a similarity measure associated with each of the one or more solutions, wherein determining further comprises determining a distance measure between each of the one or more vectorized solutions and one or more centroids of one or more clusters formed by the one or more vectorized solutions.

5. The system of claim 4, wherein the at least one processing device is further configured to:

compare the similarity measure associated with each of the one or more solutions with a predetermined threshold;

determine that the similarity measure associated with each of the one or more solutions is greater than the predetermined threshold; and determine the one or more unique solutions based on at least determining the one or more solutions with the similarity measure that is greater than the predetermined threshold.

6. The system of claim 1, wherein the administrative record further comprises one or more prior query strings corresponding to the one or more prior response strings.

7. A computer program product for predictive generation of electronic query data, the computer program product comprising a non-transitory computer-readable medium comprising code causing a first apparatus to:

electronically receive, from an endpoint device, a query string associated with an administrative body, wherein the query string corresponds to a response field, and wherein the response field is configured to receive a response string;

retrieve, from a database associated with an entity, information associated with the administrative body;

determine an administrative record associated with the administrative body, wherein the administrative record comprises one or more prior response strings;

generate, using a machine learning model trained using prior query strings, one or more customized autofill options for the response string based on at least the information associated with the administrative body and the administrative record associated with the administrative body;

determine one or more articulation levels, based on a linguistic complexity metric, associated with the one or more customized autofill options;

tag the one or more customized autofill options with the one or more articulation levels corresponding to the one or more customized autofill options; and transmit control signals configured to cause the endpoint device to display, on a graphical user interface of the endpoint device, the one or more customized autofill options.

8. The computer program product of claim 7, wherein the first apparatus is further configured to:

determine an articulation level requirement of the administrative body;

determine one or more applicable customized autofill options from the one or more customized autofill options based on at least the articulation level requirement of the administrative body; and transmit control signals configured to cause the endpoint device of the user to display, on the graphical user interface of the endpoint device, the one or more applicable customized autofill options.

9. The computer program product of claim 7, wherein the first apparatus is further configured to:

generate one or more complete response strings based on at least the query string and the one or more customized autofill options;

determine one or more solutions to the one or more complete response strings;

determine one or more unique solutions from the one or more solutions; and transmit control signals configured to cause the endpoint device of the user to display, on the graphical user interface of the endpoint device, the one or more customized autofill options associated with the one or more unique solutions.

10. The computer program product of claim 9, wherein the first apparatus is further configured to:

initiate a vectorization engine on the one or more solutions;

vectorize, using the vectorization engine, the one or more solutions into a vector of real numbers;
map, using the vectorization engine, the one or more vectorized solutions in a vector space; and
determine a similarity measure associated with each of the one or more solutions, wherein determining further comprises determining a distance measure between each of the one or more vectorized solutions and one or more centroids of one or more clusters formed by the one or more vectorized solutions.

11. The computer program product of claim 10, wherein the first apparatus is further configured to:
compare the similarity measure associated with each of the one or more solutions with a predetermined threshold;
determine that the similarity measure associated with each of the one or more solutions is greater than the predetermined threshold; and
determine the one or more unique solutions based on at least determining the one or more solutions with the similarity measure that is greater than the predetermined threshold.

12. The computer program product of claim 7, wherein the administrative record further comprises one or more prior query strings corresponding to the one or more prior response strings.

13. A method for predictive generation of electronic query data, the method comprising:
electronically receiving, from an endpoint device, a query string associated with an administrative body, wherein the query string corresponds to a response field, and wherein the response field is configured to receive a response string;
retrieving, from a database associated with an entity, information associated with the administrative body;
determining an administrative record associated with the administrative body, wherein the administrative record comprises one or more prior response strings;
generating, using a machine learning model trained using prior query strings, one or more customized autofill options for the response string based on at least the information associated with the administrative body and the administrative record associated with the administrative body;
determining one or more articulation levels, based on a linguistic complexity metric, associated with the one or more customized autofill options;
tagging the one or more customized autofill options with the one or more articulation levels corresponding to the one or more customized autofill options; and
transmitting control signals configured to cause the endpoint device to display, on a graphical user interface of the endpoint device, the one or more customized autofill options.

14. The method of claim 13, wherein the method further comprises:
determining an articulation level requirement of the administrative body;
determining one or more applicable customized autofill options from the one or more customized autofill options based on at least the articulation level requirement of the administrative body; and
transmitting control signals configured to cause the endpoint device of the user to display, on the graphical user interface of the endpoint device, the one or more applicable customized autofill options.

15. The method of claim 13, wherein the method further comprises:
generating one or more complete response strings based on at least the query string and the one or more customized autofill options;
determining one or more solutions to the one or more complete response strings;
determining one or more unique solutions from the one or more solutions; and
transmitting control signals configured to cause the endpoint device to display, on the graphical user interface of the endpoint device, the one or more customized autofill options associated with the one or more unique solutions.

16. The method of claim 15, wherein the method further comprises:
initiating a vectorization engine on the one or more solutions;
vectorizing, using the vectorization engine, the one or more solutions into a vector of real numbers;
mapping, using the vectorization engine, the one or more vectorized solutions in a vector space; and
determining a similarity measure associated with each of the one or more solutions, wherein determining further comprises determining a distance measure between each of the one or more vectorized solutions and one or more centroids of one or more clusters formed by the one or more vectorized solutions.

17. The method of claim 16, wherein the method further comprises:
comparing the similarity measure associated with each of the one or more solutions with a predetermined threshold;
determining that the similarity measure associated with each of the one or more solutions is greater than the predetermined threshold; and
determining the one or more unique solutions based on at least determining the one or more solutions with the similarity measure that is greater than the predetermined threshold.

18. The method of claim 13, wherein the administrative record further comprises one or more prior query strings corresponding to the one or more prior response strings.

* * * * *